United States Patent [19]
Fukuchi et al.

[11] Patent Number: 5,637,359
[45] Date of Patent: Jun. 10, 1997

[54] PLASTIC SUBSTRATE LIQUID CRYSTAL DISPLAY DEVICE, METHOD OF MAKING, AND PRODUCT PRODUCED BY THE METHOD

[75] Inventors: Shunsei Fukuchi; Kenji Misono; Kyouhei Isohata, all of Nara; Makoto Iwamoto, Yamato Koriyama; Hiroshi Takanashi, Souraku-gun, all of Japan

[73] Assignee: Sharp Kabushiki Kaisha, Osaka, Japan

[21] Appl. No.: 981,393

[22] Filed: Nov. 25, 1992

[30] Foreign Application Priority Data

Nov. 28, 1991  [JP]  Japan ................... 3-314991

[51] Int. Cl.⁶ .................................................. C09K 19/00
[52] U.S. Cl. ........................... 428/1; 428/473.5; 428/910; 358/75; 358/76
[58] Field of Search ..................... 428/1, 473.5, 910; 358/75, 76

[56] References Cited

FOREIGN PATENT DOCUMENTS

| 56-52722 | 5/1981 | Japan. |
| 60-66232 | 4/1985 | Japan. |
| 61-47931 | 3/1986 | Japan. |
| 371476 | 10/1992 | Japan. |

Primary Examiner—Leszek Kiliman

[57] ABSTRACT

There is provided a plastic liquid crystal display device in which an aligning film processing can be carried out at 150 to 180° C. and which can have optical characteristics comparable to those of the conventional glass substrate liquid crystal display device. The plastic liquid crystal device comprises a pair of plastic substrates, transparent electrodes, insulating films for protecting the electrodes, aligning films and a liquid crystal, wherein the aligning film is an aligning film which is formed by dissolving a high-temperature sintering organic polymer aligning film made of polyimide or a polyimide-like substance in a solvent, printing a resulting solution thereof on a substrate, removing only the solvent by heating and/or heating under reduced pressure, and sintering the substrate at 200° C. or less.

21 Claims, 1 Drawing Sheet

PLASTIC SUBSTRATE LIQUID CRYSTAL DISPLAY DEVICE, METHOD OF MAKING, AND PRODUCT PRODUCED BY THE METHOD

BACKGROUND OF THE INVENTION

1. Field of the Invention

The present invention relates to a liquid crystal display device using plastic substrates and more particularly to a plastic substrate liquid crystal display device which is principally used as a display device for OA(Office Automation) appliances such as a note type personal computer, a word processor and a palm-top type personal computer.

2. Description of the Prior Art

A typical liquid crystal display device is comprised of a pair of plastic substrates, transparent electrodes, insulating films for protecting the electrodes (protective films), aligning or orientation films and a liquid crystal. A method of manufacturing this type of liquid crystal display device will be described with reference to FIG. 1. The manufacture method described herein is directed to a liquid crystal display device using a pair of plastic film substrates 3 and 3 as shown in FIG. 1

Firstly, plastic substrates 3 each have at both surfaces thereof hard coats (wear-proof coatings) 2 and 4 made of a resin of acryl system or a silicone system. The plastic substrate 3 is formed at one surface (provided with the hard coat 4) with an ITO electrode 5 made of indium oxide added with tin. Subsequently, an upper protective film 6 is coated on the surface of the ITO electrode 5 in a thickness of 500 to 1500 Å by means of an offset printing machine which uses a commercially available material of silica coating ink (Ti-Si film manufactured by Tokyo Ohka).

Thereafter, the substrate 3 coated with the silica coating ink is pre-sintered at a temperature of 70° C. for a few minutes. Through this, a solvent of high boiling point contained in the ink can be evaporated to some extent, with the result that the ink is increased in viscosity and prevented from flowing on the substrate 3.

In the liquid crystal display device using the plastic film substrates 3, thermal stability of the plastic film substrate 3 is insured at 200° C. or less and correspondingly the sintering temperature of the silica coating ink must be limited to 200° C. or less. However, by simply setting the sintering temperature to 200° C. or less, the insulating capability and hardness of the protective film cannot be ensured.

To cope with this problem, the inventor of the present application has already proposed in Japanese Patent Application No. 3-71476 that in order to obtain low temperature sintering at about 200° C., ultraviolet(UV) light is irradiated on the coating ink by means of a low pressure mercury vapor lamp to volatilize the solvent in the coating ink.

More specifically, ultraviolet light is irradiated on the pre-sintered silica coating ink for five minutes by using the low pressure mercury vapor lamp. The substrate 3 is then sintered at a sintering temperature of 170° C. for one hour. Since in this phase the solvent of high boiling point has already been removed from the ink by the irradiation of ultraviolet light to make easy the association between molecules of the remaining solid substance, the dehydration condensation of the ink can be effected sufficiently even at the 170° C. (less than 200° C.) sintering temperature. In this manner, an upper protective film (top coat) 6 having sufficient insulation and hardness to protect the ITO electrode 5 can be formed without thermally changing the nature of the plastic film substrate 3. Thereafter, an aligning film 7 is formed on the surface of the upper protective film 6. A pair of thus prepared substrates 3 and 3 are arranged to oppose to each other, a liquid crystal 9 is filled while sealing the substrates by a seal agent 8 and polarizer plates 1 are attached, thus completing the manufacture procedure.

However, in conventional liquid crystal display devices including one manufactured by the above-described manufacture method, the aligning film is made of polyimide. The polyimide is created through condensation reaction of polyamic acid and a sintering temperature of 250° to 350° C. is needed for the condensation reaction. Therefore, even if the insulation and hardness of the protective film can be ensured at the heat-proof temperature of plastic being 200° C. or less in the manner described above, the temperature is insufficient to provide the sintering temperature required for the conventional aligning film.

Accordingly, in the conventional liquid crystal display device, the shortage of this sintering temperature raised the most difficult problem in the procedure of making the plastic substrate liquid crystal display device, and this sintering temperature remarkably affected electrooptical characteristics of the device, i.e., the display quality and had a fatal influence upon the contrast, so that satisfactory optical characteristics could not sometimes be obtained.

Various techniques have hitherto been proposed to solve the above problems.

One of them is disclosed in Japanese Patent Application Laid-open No.56-52722. This literature describes a method of making a liquid crystal display panel wherein polymer or bismaleimide represented by the following repetitive unit (III) is reacted with benzil oxime to create polymer, the thus created polymer is dissolved in a solvent to provide a solution, the solution is coated on a plastic film panel substrate and dried and then sintered at a temperature of less than 150° C. to form an aligning processing film, and then the film is subjected to a rubbing processing. By this making method, horizontal orientation performance which is physically and chemically stable at a temperature less than the heat-proof temperature of plastic film can be obtained.

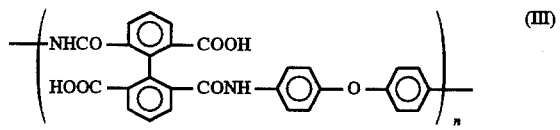

(III)

Another conventional technique is disclosed in Japanese Patent Application Laid-open No.61-47931.

This literature describes that an aligning film mainly containing vinylidene chloride/vinyl chloride copolymer is formed in order to obtain an aligning film having excellent performance for uniformly orienting the liquid crystal. It also describes that the vinylidene chloride/vinyl chloride copolymer is dissolved in a cyclic ether type solvent such as dioxane or tetrahydrofuran to prepare a solution and the solution is coated, dried and subjected to heat treatment in accordance with a conventionally known method to form a film which in turn undergoes a rubbing processing. The heat treatment is effected at a temperature of about 60° to 100° C.

Still another conventional technique is disclosed in Japanese Patent Application Laid-open No. 60-66232. This literature describes that alkyd melamine polymer is used as an aligning film material which can exhibit excellent ability to orient the liquid crystal and which can be treated at so low a temperature that a plastic film substrate is allowed to be used. It also describes that especially, alkyd melamine polymer filled with silica is dried for about 30 minutes at a relatively low temperature, for example, 150° C. to form an aligning film which has excellent ability to orient the liquid crystal and which is highly reliable from the standpoint of orientation capability and increase of current.

SUMMARY OF THE INVENTION

The present invention contemplates elimination of the prior art drawbacks and it is an object of the invention to provide a plastic liquid crystal display device in which an aligning film processing can be carried out at 200° C. or less, especially, 150° to 180° C. and which can have optical characteristics comparable to those of the conventional glass substrate liquid crystal display device.

According to the invention, to accomplish the above object, in a liquid crystal display device comprising a pair of plastic substrates, transparent electrodes, insulating films for protecting the electrodes, aligning films and a liquid crystal, the aligning film is an aligning film which is formed by dissolving a high-temperature sintering organic polymer made of polyimide or polyimide-like substance in a solvent, printing a resulting solution on a substrate, removing only the solvent by heating and/or heating under reduced pressure, and sintering the substrate at 200° C. or less.

Preferably, any one of 1,4-phenylene diamine, 4,4'-methylene dianiline, 4-aminophenyl ether, diamino diphenyl ether and diamino diphenyl methylene may be used as a diamine component which is easy to sublime in polycondensation for formation of the polyimide.

Preferably, any one of pyromellitic anhydride, 1,2,3,4-cyclobutane tetracarboxylic acid and derivatives thereof, 1,2,3,4-cyclopentane tetracarboxylic acid and derivatives thereof, 2,3,5-tricarboxy cyclopentyl acid and derivatives thereof, 3,5,6-tricarboxy-norbornane-2-acetic acid and derivatives thereof, 5-(2,5-dioxotetrahydrofuryl)-3-methylcyclohexene dicarboxylic acid and derivatives thereof, bicyclo-(2,2,2)-octo-7-ene-tetracarboxylic acid, 1,2,3,4-furan tetracarboxylic acid and derivatives thereof and 3,3', 4,4'-perfluoroisopropylidenediphenyl tetracarboxylic acid and derivatives thereof may be used as a tetracarboxylic acid component which is easy to sublime in polycondensation for formation of polyimide.

Preferably, the heating under reduced pressure may be carried out at a reduced pressure of $1 \times 10^{-6}$ Torr.

Preferably, any one of N-methyl pyrrolidone, ethyl carbitol, butyl cellosolve acetate, n,n-dimethyl acetamide and dioxane may be used as the solvent for polyimide.

DESCRIPTION OF THE PREFERRED EMBODIMENTS

The invention will now be described in greater detail by way of example with reference to the accompanying drawing.

Figure 1:
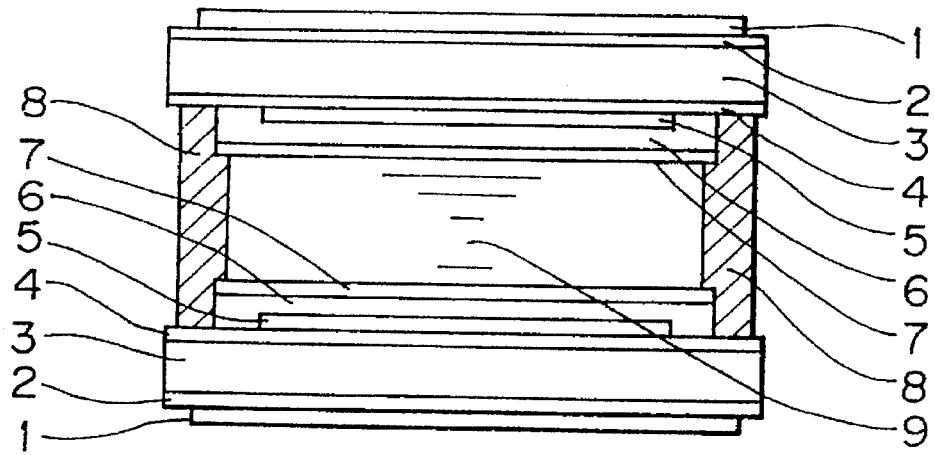
FIG. 1 is a sectional view showing a conventional plastic substrate liquid crystal display device.
Figure 2:
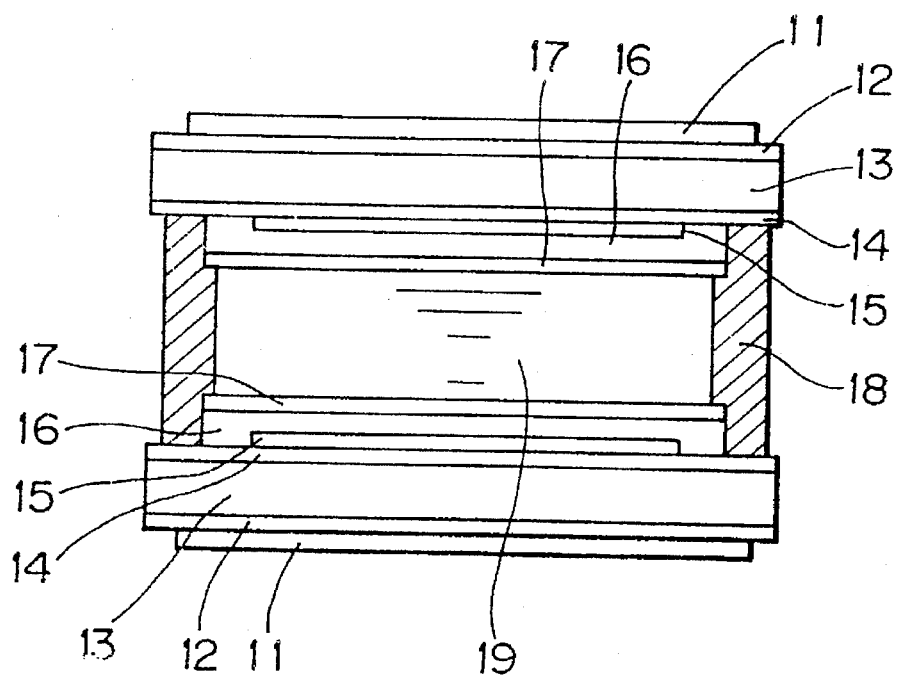
FIG. 2 is a sectional view showing a plastic substrate liquid crystal display device according to an embodiment of the invention.

FIG. 2 is a schematic diagram showing a plastic substrate liquid crystal display device according to an embodiment of the invention. In the figure, reference numeral 11 designates polarizer plates, 12 and 14 hard coats, 13 substrates, 15 transparent electrodes, 16 insulating films (top coats), 17 aligning films, 18 a seal agent and 19 a liquid crystal.

The polarizer plate 11 is adapted to permit transmission of only light oscillating intensively in a specified direction. To describe a general method of making this polarizer plate 11, a thin film of PVA (polyvinyl alcohol) is extended under application of heat and the extended film is contacted to a solution called H ink containing a large amount of iodine so that this film may absorb iodine to form a film having polarization capability.

Each of the hard coats 12 and 14 acts as a gas barrier an ITO (indium oxide added with tin) layer is used as an undercoat, and a coating film of a siloxane system is used as the hard coat.

The substrate 13 is formed of a transparent plastic resin plate which is made of plastic resin of an epoxy system or an acryl system.

For formation of the transparent electrode 15, an ITO film is formed by vapor deposition through a low temperature sputtering process and the ITO film is patterned by, for example, photoetching or a laser beam to obtain an electrode configuration.

The top coat 16 is provided on the surface of the transparent electrode 15 to serve as a thin protective layer. The top coat 16 is a coating of oxide of Ti or Si which is a film of a silica coating material (for example, MOF Ti-Si film manufactured by Tokyo Ohka Kogyo (Japanese corporation)) deposited in 700 to 1400 Å thickness through, for example, a printing process, the coating exhibiting hardness and insulating capability. More preferably, the top coat 16 may be a coating of oxide of Ti or Si combined with an acryl system resin, thus having flexibility in addition to hardness and insulating capability.

Resin of an epoxy system may also be used for the resin of the coating of top coat 16 or alternatively an inorganic material such as $SiOx$, $SiO2$, $TiO2$ or a mixture of them may be used for the coating of top coat 16.

The aligning film 17 is used to align the orientation of molecules of liquid crystal 19 filled between the opposing substrates 13 in one direction and an inorganic material such as a silane coupling agent or $SiOx$ or an organic material such as polyimide or PVA is known as the material of the aligning film. Of them, a polyimide material is rubbed in one direction and used as the aligning film in the industry at present.

The seal agent 18 is thermally fused to seal a gap between the substrates 13 so as to prevent leakage of liquid crystal 19. Used as the material of the seal agent 18 is an inorganic material such as glass or an organic material such as nylon, polyester, polyimide or thermosetting epoxy. Of them, thermoserring epoxy is preferably used.

Many kinds of liquid crystals such as nematic, cholesteric and smectic liquid crystals have been proposed and a desired one of them may be used as the liquid crystal 19. One of the typically used liquid crystals is of nonanoic acid cholesterol.

Enumerated as a diamine component which is easy to sublime in polycondensation for formation of the aformementioned polyimide are 1,4-phenylene diamine, 4,4'-methylene dianiline, 4-aminophenyl ether, diamino diphenyl ether and diamino diphenyl methylene. Of them, diamino diphenyl ether and diamino diphenyl methylene are preferable.

Enumerated as a tetracarboxylic acid component which is easy to sublime in polycondensation for formation of the aforementioned polyimide are pyromellitic anhydride, 1,2,3,4-cyclobutane tetracarboxylic acid and derivatives thereof, 1,2,3,4-cyclopentane tetracarboxylic acid and derivatives thereof, 2,3,5-tricarboxy cyclopentyl acid and derivatives thereof, 3,5,6-tricarboxy-norbornane-2-acetic acid and derivatives thereof, 5-(2,5-dioxotetrahydrofuryl)-3-methyl-cyclohexene dicarboxylic acid and derivatives thereof, bicyclo-(2,2,2)-octo-7-ene-tetracarboxylic acid, 1,2,3,4-furan tetracarboxylic acid and derivatives thereof and 3,3',4,4'-perfluoroisopropylidenediphenyl tetracarboxylic acid and derivatives thereof. Of them, pyromellitic anhydride is preferable.

By selecting the kind of monomer, an aligning film of polyamide, polyurea or polyurethane can be formed but, from the standpoint of stability of orientation, polyimide is the best.

For practicing the above polymerization reactions, a known apparatus such as disclosed in, for example, Japanese Patent Application Laid-open No.61-78463 can be utilized.

In the apparatus, a raw material monomer of polyimide is vaporized under reduced pressure to form a polyamic coating on the electrode surface of the electrode substrate and polyamide can be polymerized to polyimide.

The purpose of the vaporization of the raw material monomer of polyimide under reduced pressure is for preventing vaporized monomers from colliding with each other or with the inner wall of a polymerizing device in order to deposit monomer vapor directly on the electrode substrate to form a uniform polyamic coating, and generally the reduced pressure is set to about $1\times10^{-6}$ Torr.

Polyimide obtained by polymerization through a method using glow discharge in combination exhibits liquid crystal orientation capability. Conceivably, this is due to the fact that ions and electrons generated during glow discharge are caused by an electric field to impinge on the polyamic coating surface at an almost zero angle respect thereto so as to bring about an effect equivalent to the rubbing processing, and that under this condition, the polymerization to polyimide is carried out.

If heating of the monomer subject to polymerization reaction is needed, a the monomer is heated in advance or a method is employed in which monomer is deposited on the substrate at room temperature and thereafter the substrate is heated.

Thus, in order to promote sublimation under reduced pressure, a monomer of tetracarboxyl acid and a monomer of diamine may preferably be heated by a substrate heating heat source at about 160° C. and at about 140° C., respectively. Further, in order to promote polyamic reaction, the electrode substrate may preferably be heated to 40° C. or more.

An existing reduced pressure evaporation/polymerization apparatus, for example, vacuum evaporation/polymerization apparatus VEP-100A manufactured by Nippon Shinku Gijutsu Kabushiki-kaisha may be available.

A solvent vaporizable by heating or heating under reduced pressure may be used suitably for dissolving polyimide. For example, N-methyl pyrrolidone (bp; about 203° C.), ethyl carbitor (bp; about 200° C.), butyl celloslve acetate (bp; 164° C.), n,n-dimethyl acetamide (bp; 164° C.) and dioxane (bp; 164° C.) may be enumerated.

Also, these solvents may be mixed suitably and a resulting solvent mixture solvent may be used.

These materials are used to form an aligning film 17 by printing, evaporation and sintering through the procedure practiced in accordance with the following steps (1) to (4).

(1) The polycondensed polyimide is dissolved in the solvent to form ink.

(2) The ink is printed on a plastic substrate through an conventional relief process to form an aligning film pattern and then is pre-sintered at about 70° C.

(3) After pre-sintering, the solvent is removed by heating at about 80° to 100° C. and/or at reduced pressure of $1\times10^{-1}$ to $10^{-2}$ Torr.

(4) After removal of the solvent, the resulting film is sintered at 150° to 180° C. to form an aligning film. The aligning films 17 of the liquid crystal display device shown in FIG. 2 were formed in accordance with the above steps (1) to (4) to obtain results to be described below.

Specifically, the above procedure steps (1) to (4) were practiced to form an aligning film on condition that sintering is effected at 70° C. for 30 minutes, a resulting film is placed at a reduced pressure of $1\times10^{-1}$ Torr for 30 minutes in order for a solvent to be evaporated and removed and after removal of the solvent, a resulting film is sintered at 180° C. for one hour and thirty minutes.

Initial characteristics and reliability of a liquid crystal display device having the thus formed aligning films were evaluated to obtain such results that faults such as focal-conic texture and domain are not found, and the contrast was recognized to be of the same level as that of a liquid crystal display device using glass substrates.

Since according to the present invention the polyimide polycondensation processing is carried out prior to ink adjustment, the aligning film processing can be effected at 200° C. or less, especially, 150° to 180° C. and a plastic liquid crystal display device having optical characteristics of the same level as the conventional glass substrate liquid crystal display device can be provided.

What is claimed is:

1. A plastic substrate liquid crystal display device comprising a pair of plastic substrates, a pair of transparent electrodes, a pair of insulating films for protecting said electrodes, a pair of aligning films and a liquid crystal, wherein each of said aligning films is formed by dissolving a high-temperature sintering organic polymer made of polyimide in a solvent, printing the resulting solution thereof on a substrate, removing only said solvent by heating or heating under a reduced pressure of $1\times10^{-1}$ to $1\times10^{-2}$ Torr, and sintering said substrate at 200° C. or less.

2. A plastic substrate liquid crystal display device according to claim 1 wherein any one of 1,4-phenylene diamine, 4,4'-methylene dianiline, 4-aminophenyl ether, diamino diphenyl ether and diamino diphenyl methylene is used as a diamine component for formation of said polyimide.

3. A plastic substrate liquid crystal display device according to claim 1 wherein any one of: pyromellitic anhydride, 1,2,3,4-cyclobutane tetracarboxylic acid and derivatives thereof, 1,2,3,4-cyclopentane tetracarboxylic acid and derivatives thereof, 2,3,5-tricarboxy cyclopentyl acid and derivatives thereof, 3,5,6-tricarboxynorbornane-2-acetic acid and derivatives thereof, 5-(2,5-dioxotetrahydrofuryl)-3-methyl-cyclohexene dicarboxylic acid and derivatives thereof, bicyclo-(2,2,2)-octo-7-ene-tetracarboxylic acid, 1,2,3,4-furan tetracarboxylic acid and derivatives thereof and 3,3',4,4'-perfluoroisopropylidenediphenyl tetracarboxylic acid and derivatives thereof is used as a tetracarboxylic acid component for formation of said polyimide.

4. A plastic substrate liquid crystal display device according to claim 1 wherein any one of N-methyl pyrrolidone, ethyl carbitol, butyl cellosolve acetate, n,n-dimethyl acetamide and dioxane is used as said solvent for said polyimide.

5. A plastic substrate liquid crystal display device according to claim 1 wherein the substrates being printed with resulting solution are pre-sintered at about 70° C.

6. A plastic substrate liquid crystal display device according to claim 1 wherein the heating or the heating under reduced pressure is carried out at about 80° to 100° C.

7. A plastic substrate liquid crystal display device according to claim 1 wherein the pair of substrates are sintered at 150° to 180° C. to remove said solvent.

8. A method of making a plastic substrate liquid crystal display device, said device including a pair of plastic substrates, transparent electrodes, insulating films for protecting said electrodes, aligning films, and a liquid crystal, said method characterized by forming said aligning films by dissolving a high-temperature sintering organic polymer made of polyimide in a solvent, printing the resulting solution on a substrate, removing only said solvent by heating or heating under a reduced pressure of $1 \times 10^{-1}$ to $1 \times 10^{-2}$ Torr, and sintering said substrate at 200° C. or less.

9. The method of claim 8, wherein any one of 1,4-phenylene diamine, 4,4'-methylene dianiline, 4-aminophenyl ether, diamino diphenyl ether and diamino diphenyl methylene is used as a diamine component for formation of the polyimide.

10. The method of claim 8, wherein any one of pyromellitic anhydride, 1,2,3,4-cyclobutane tetracarboxylic acid and derivatives thereof, 1,2,3,4-cyclopentane tetracarboxylic acid and derivatives thereof, 2,3,5-tricarboxy cyclopentyl acid and derivatives thereof, 3,5,6-tricarboxy-norbornane-2-acetic acid and derivatives thereof, 5-(2,5-dioxotetrahydrofuryl)-3-methylcyclohexene dicarboxylic acid and derivatives thereof, bicyclo(2,2,2)-octo-7-ene-tetracarboxylic acid, 1,2,3,4-furan tetracarboxylic acid and derivatives thereof and 3,3'4 4,'- perfluoroisopropylidene-diphenyl tetracarboxylic acid and derivatives thereof is used as a tetracarboxylic acid component for formation of the polyimide.

11. The method of claim 8, wherein any one of N-methyl pyrrolidone, ethyl carbitol, butyl cellusolve acetate, n,n-dimethyl acetamide and dioxane is used as said solvent for the polyimide.

12. The method of claim 8, wherein the substrates being printed with resulting solution are presintered at about 70° C.

13. The method of claim 8, wherein the heating or the heating under reduced pressure is carried out at about 80° to 100° C.

14. The method of claim 8, wherein the substrates being removed of the solvent are sintered at 150 to 180° C.

15. The product produced by the method of claim 8.
16. The product produced by the method of claim 9.
17. The product produced by the method of claim 10.
18. The product produced by the method of claim 12.
19. The product produced by the method of claim 13.
20. The product produced by the method of claim 14.
21. The product produced by the method of claim 11.

* * * * *